Sept. 12, 1950   T. M. KNOWLAND ET AL   2,522,277

CARD APRON

Filed Jan. 8, 1949

HYCAR 15-35%
NEOPRENE 85-65%

Inventors
Thomas M. Knowland
and Donald R. Currier
Kenway, Jenney, Witter & Hildreth.
Attorneys Patented Sept. 12, 1950

2,522,277

UNITED STATES PATENT OFFICE 2,522,277

CARD APRON

Thomas M. Knowland, Belmont, and Donald R. Currier, Lexington, Mass., assignors to Boston Woven Hose and Rubber Company, Cambridge, Mass., a corporation of Massachusetts Application January 8, 1949, Serial No. 69,962

2 Claims. (Cl. 19—153)

This invention consists in a new and improved composite rub apron for use in the condensing mechanism of carding machines. In one aspect it comprises an improvement on the apron disclosed in Letters Patent No. 2,233,985, March 4, 1941, Knowland and Russell.

The principal object of the invention is to provide a rub apron of rubbery texture that may be relied upon for a long trouble-free life in service while maintaining uniformly and continuously an effective surface texture.

Difficulty has been encountered heretofore because of the disintegrating effect on rub aprons of the oil contained in or upon the wool fibre. It is the practice to treat wool for carding and other purposes with a substantial quantity of oil emulsion, amounting in some cases to as much as 6% of the weight of the wool itself. For this reason it is highly important that the composition used in the rub apron should be highly resistant to mineral, animal and vegetable oils. At the same time the industry requires that the apron should be light in color, incapable of marking or staining the wool in process, and free from odor. Heretofore neoprene (polymerized chloroprene) has been employed as the material of the apron facing. During recent years, however, there has been a continual increase in the use of animal oil such as lard oil, oleic acid and the like, as well as various vegetable oils. These oils, used in large amounts, have a rapid deteriorating effect on neoprene (polymerized chloroprene) in rub aprons, so much so that the effective life of the aprons is greatly decreased. The action of such oils is to soften the neoprene so that the rate of wear is greatly increased. On the other hand, we have noted that a mild softening attack by oil on a neoprene (polymerized chloroprene) facing greatly increases the rubbing efficiency of the belt if the attack is limited to no more than a slight swelling and softening of the surface material. Excessive softening and swelling as previously pointed out results in objectionably rapid wear and prohibitive cost of maintenance.

Attempts have been made to substitute for neoprene (polymerized chloroprene) other synthetic rubbers of high resistance to animal oils, but these synthetics, such as Hycar (butadiene acrylonitrile copolymer), are so extremely oil resistant that the surface provided by them tends to wear smooth and glaze with the result that the rubbing action of the belt is almost completely lost.

We have discovered, however, that the objections above outlined may be obviated and important advantages achieved by employing a suitable mixture of neoprene (polymerized chloroprene) and Hycar (butadiene acrylonitrile copolymer), that is to say, employing sufficient Hycar (butadiene acrylonitrile copolymer) to build up resistance to animal oils and sufficient neoprene (polymerized chloroprene) so that the surface of the apron will be subject to a mild attack by the oils contained in the wool, thus conditioning the apron surface for most efficient rubbing action and at the same time preserving it from excessive wear. We have found that it is possible to mix 15 to 35% Hycar (butadiene acrylonitrile copolymer) with 85 to 65% neoprene (polmerized chloroprene) and thereby secure a suitable composition of these two materials which will have an extremely high degree of oil resistance and at the same time present a surface which is kept at all times in a high state of rubbing efficiency through the mild attack of the oils in the wool on the neoprene (polymerized chloroprene) component of the composition.

Another feature of our invention relates more particularly to the reinforcing fabric components of the rub apron. Heretofore straight cut plies of rubberized fabric have been employed for this purpose. We have found, however, that certain advantages are attained by forming the marginal face of the apron of bias cut fabric. For example, the edges of the apron are rendered more flexible and travel about their supporting rolls more easily and with less strain on the apron; the guide buttons which are usually attached by rivets to the apron are more securely and reliably retained in position; and the raveling of threads at the edge of the belt is obviated.

These and other features of the invention will be best understood and appreciated from the following description of a preferred embodiment thereof, selected for purposes of illustration and shown in the accompanying drawings, in which.

In constructing the improved apron of our invention, the fabric and rubber plies are built up or assembled upon a cylindrical mandrel of the proper dimensions and then vulcanized upon the mandrel or by other suitable processes of vulcanization. As suggested in Fig. 1, two plies 10 of rubberized 8 to 11 oz. army duck are first spread or wrapped upon the mandrel. Then a five-ply cap or thickened marginal zone is built up about each end of the mandrel by wrapping five narrow plies 11 of rubberized duck about the mandrel outside the base play 10. The plies 11 preferably comprise the same material as the base ply and are graduated in width, that is, the innermost ply is the widest of the series and the superposed plies are stepped down in their width so that they form at their inner ends an outwardly and upwardly sloping composite surface.

Figure 2:
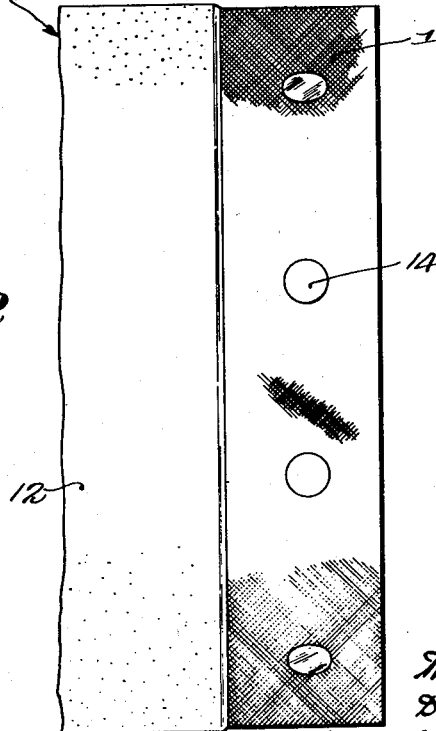
Fig. 2 is a fragmentary view in end elevation.

The base plies 10 and the inner marginal plies are of straight cut fabric, whereas the two outer marginal plies 11 at each edge of the apron are of bias cut fabric as indicated in Fig. 2. The outer ends of the two base plies 10 and of all the marginal plies 11 are built or trimmed square, and all the plies together constitute solid marginal binding caps which may be approximately 1¼" to 1½" in width at the outermost or top ply. The end construction is sufficiently strong to support the guide buttons 13 and to protect the ends of the rubbery portion of the apron. The end portions are also preferably somewhat thinner in gauge than the active rubbing portion of the apron. Furthermore, when running idle, the ends being of lesser gauge do not abrade one another. The composition used in rubberizing the duck of the fabric plies and in binding them together is preferably oil-resistant synthetic rubber composition of the character hereinafter disclosed.

Figure 1:
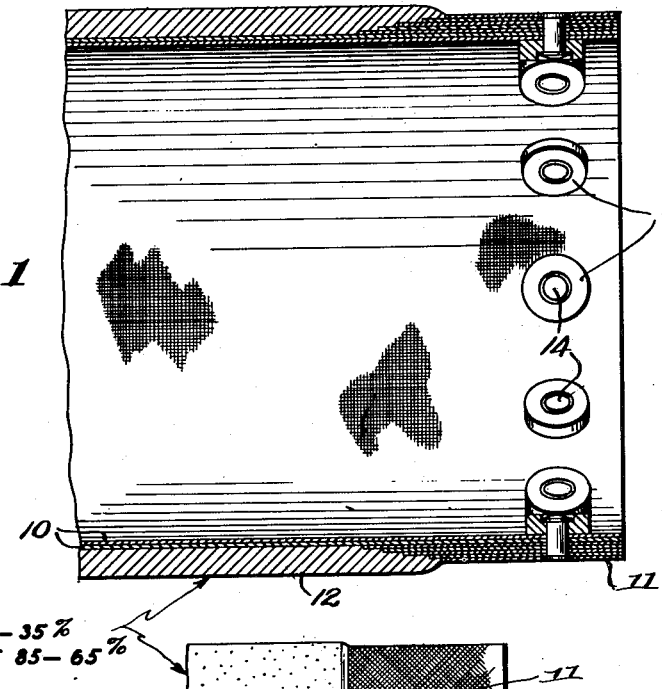
Fig. 1 is a sectional view showing the internal construction of the apron.

Having built up the fabric portion of the apron, we next apply to its periphery and between the fabric marginal portions a body 12 of oil-resistant synthetic rubber composition. This may be calendered upon the apron to a uniform depth of ⅛" to 1/16" or any thickness which will give the body portion of the apron at least a slightly greater thickness than that of the fabric marginal portions thereof. As shown in Fig. 1, the outer edges of the rubbery body 12 are conformed to the composite sloping surface presented by the inner end of the binding ply 11 and are beveled to meet the inner edge of the outermost bias binding ply.

The best formula now known to us for the rubbery portion 12 of the apron in percentage by weights is as follows:

| | |
|---|---:|
| Neoprene (polymerized chloroprene) | 38.20 |
| Hycar (butadiene acrylonitrile copolymer) | 9.58 |
| Agerite White (di-B-naphthyl-p-phenylenediamine) | 2.87 |
| Flectol-H (acetone-aniline condensation product) | 0.96 |
| Stearite | 0.48 |
| Paraffin wax | 0.72 |
| Dibutyl phthalate | 3.58 |
| Magnesium oxide | 1.91 |
| Zinc oxide | 0.96 |
| Titanium dioxide | 1.19 |
| Pigment | 0.10 |
| Calcium silicate | 15.55 |
| Clay | 23.90 |
| | 100.00 |

This composition may be milled in the conventional manner and then calendered upon the apron while the latter is supported on its mandrel. Subsequently the vulcanizing operation is carried out and the vulcanized apron may then be removed from its mandrel. The guide buttons 13 may then be attached by rivets 14 to the inner surface of the fabric binding zones of the apron. After a final sanding operation the apron is ready for use in its condensing capacity.

In the foregoing formula the synthetic rubber composition includes about 20% Hycar (butadiene acrylonitrile copolymer) and 80% neoprene (polymerized chloroprene). Careful investigation indicates that a range of 15 to 35% Hycar (butadiene acrylonitrile copolymer) and 85 to 65% neoprene (polymerized chloroprene) in the synthetic rubber composition will result in a suitable material for our improved apron, that is to say, one which is sufficiently oil-resistant to have a long trouble-free life while at the same time presenting a slightly softened surface and therefore one which is of maximum condensing efficiency. If less than 15% Hycar (butadiene acrylonitrile copolymer) is employed, the softening attack of the oil is so great as to impair the useful life of the apron, whereas if more than 35% Hycar (butadiene acrylonitrile coploymer) is employed the effective surface tends to glaze and lose its efficiency.

While we have described the specific embodiment of our invention illustrated in the drawings as including in its structure two marginal plies of bias cut fabric, it will be understood that any or all of the marginal plies may be of bias cut fabric within the scope of our invention. Further, while Hycar (butadiene acrylonitrile copolymer) and neoprene (polymerized chloroprene) have been specifically mentioned as the best material now known to us as ingredients of the rubbery facing of our improved rub apron, any other synthetic elastomers having the oil reacting properties of Hycar (butadiene acrylonitrile copolymer) and neoprene (polymerized chloroprene) and which are compatible, are to be considered as equivalents of those materials, and within the scope of our invention.

Having thus disclosed our invention and described in detail an illustrative embodiment thereof, we claim as new and desire to secure by Letters Patent:

1. A card apron comprising a fabric base and an active rubbing facing including in its composition from 15 to 35% by weight butadiene acrylonitrile copolymer which is highly resistant to oils, and 85 to 65% polymerized chloroprene which is softened by contact with oils in or upon the fibres being worked, with the addition of conventional plasticizing and filling agents, the facing being rendered highly efficient in its rubbing action by the softening of the polymerized chloroprene and being thereby safeguarded against glazing in use.

2. A card apron or the like comprising a series of straight cut base layers of rubberized fabric and marginal bias cut layers united thereto, in combination with a facing layer of elastic composition extending continuously between the said marginal bias cut layers and comprising from 15 to 35% by weight butadiene acrylonitrile copolymer and 85 to 65% polymerized chloroprene which is softened by contact with oils in or upon the fibres being worked, the facing being rendered highly efficient in its rubbing action by the softening of the polymerized chloroprene and being thereby safeguarded against glazing in use.

THOMAS M. KNOWLAND.
DONALD R. CURRIER.

REFERENCES CITED

The following references are of record in the file of this patent:

UNITED STATES PATENTS

| Number | Name | Date |
|---|---|---|
| 2,233,985 | Knowland et al. | Mar. 4, 1941 |

OTHER REFERENCES

"Sunlight Resistance of Hycar O. R. Compounds," by Garvey and Emmett, Ind. and Eng. Chem., March 1944, pages 209–211. (Copy in Div. 50.)